(12) United States Patent
Cannon et al.

(10) Patent No.: US 6,447,423 B1
(45) Date of Patent: Sep. 10, 2002

(54) METHOD AND APPARATUS FOR ADJUSTING TRANSMISSION RATIO COMMANDS FOR A CONTINUOUSLY VARIABLE TRANSMISSION

(75) Inventors: Howard N. Cannon, Sparland; Larry E. Kendrick, Peoria, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/630,336

(22) Filed: Jul. 31, 2000

(51) Int. Cl.$^7$ .............................................. B60K 41/12
(52) U.S. Cl. ...................................................... 477/46
(58) Field of Search ............................. 477/43, 46, 125

(56) References Cited

U.S. PATENT DOCUMENTS

| | | | |
|---|---|---|---|
| 4,153,128 A | | 5/1979 | Heitmeyer et al. |
| 4,580,465 A | * | 4/1986 | Omitsu ........................ 74/866 |
| 4,713,987 A | * | 12/1987 | Matsumura .................. 74/866 |
| 5,492,189 A | | 2/1996 | Kriegler et al. |
| 5,498,216 A | | 3/1996 | Bitsche et al. |
| 5,507,372 A | | 4/1996 | Boardman et al. |
| 5,562,565 A | | 10/1996 | Moroto et al. |
| 5,562,566 A | | 10/1996 | Yang |
| 5,571,058 A | | 11/1996 | Schmidt |
| 5,603,672 A | | 2/1997 | Zhang |
| 5,700,225 A | * | 12/1997 | Roovers et al. ............... 477/46 |
| 5,801,497 A | | 9/1998 | Shamoto et al. |
| 5,833,570 A | | 11/1998 | Tabata et al. |
| 5,879,265 A | | 3/1999 | Bek |
| 5,941,358 A | | 8/1999 | Hosseini et al. |

* cited by examiner

Primary Examiner—Saul Rodriguez
(74) Attorney, Agent, or Firm—John W. Morrison; Steve M. Hanley

(57) ABSTRACT

An apparatus for controlling a continuously variable transmission is disclosed. The apparatus includes (i) an input shaft driven by an engine, (ii) an output shaft, (iii) an operator input for generating speed commands, and (iv) a controller operable to receive said speed commands and generate transmission ratio commands which control a ratio of a speed of the output shaft to a speed of the input shaft. An upper transmission ratio limit is defined by first engine speed and a lower transmission ratio limit is defined by a second engine speed. When the speed command requires a transmission ratio command greater than the upper transmission ratio limit, the controller adjusts the transmission ratio command to the upper transmission ratio limit, whereas when the speed command requires a transmission ratio command less than the lower transmission ratio limit the controller adjusts the transmission ratio command to the lower transmission ratio limit. A method for controlling a continuously variable transmission is also disclosed.

10 Claims, 3 Drawing Sheets

METHOD AND APPARATUS FOR ADJUSTING TRANSMISSION RATIO COMMANDS FOR A CONTINUOUSLY VARIABLE TRANSMISSION

TECHNICAL FIELD OF THE INVENTION

The present invention generally relates to a continuously variable transmission, and more specifically to a method and apparatus for adjusting transmission ratio commands for a continuously variable transmission.

BACKGROUND OF THE INVENTION

Many work machines, particularly earth working machines, use a continuously variable transmission to drive traction wheels or tracks which propel the work machine. Typically, a hydrostatic transmission, consisting of a variable speed hydraulic pump and a hydraulic motor, provides a continuously variable speed output to the wheels or tracks of the work machine. In particular, the speed output can be continuously varied by controlling the displacement of the hydraulic pump.

Conventional transmissions operate over a distinct number of gear ratios. Shifts between adjacent gear ratios generally keeps an engine, which drives the transmission, within its desired operating range. A drawback to a continuously variable transmission is that transmission ratios, or the ratio of transmission output speed to engine speed, can be commanded which are outside of the desired operating range of the engine which drives the transmission. If a transmission ratio is too large, then the engine may run below its desired operating point or lug limit. Therefore, commanding too high of a transmission ratio may cause the engine to stall. On the other hand, if the transmission ratio is too low, the engine may run at a speed well above its overspeed limit. Operating the engine above its overspeed limit can potentially damage the engine or drivetrain.

What is needed therefore is a method and apparatus for adjusting the transmission ratio commands for a continuously variable transmission which overcomes the above-mentioned drawbacks.

DISCLOSURE OF THE INVENTION

In accordance with a first aspect of the present invention, there is provided an apparatus for controlling a continuously variable transmission. The apparatus includes (i)an input shaft driven by an engine, (ii)an output shaft, (iii) an operator input for generating speed commands, and (iv) a controller operable to receive said speed commands and generate transmission ratio commands which control a ratio of a speed of the output shaft to a speed of the input shaft. An upper transmission ratio limit is defined by first engine speed and a lower transmission ratio limit is defined by a second engine speed. When the speed command requires a transmission ratio command greater than the upper transmission ratio limit, the controller adjusts the transmission ratio command to the upper transmission ratio limit, whereas when the speed command requires a transmission ratio command less than the lower transmission ratio limit the controller adjusts the transmission ratio command to the lower transmission ratio limit.

In accordance with a second aspect of the present invention, there is provided a method for controlling a continuously variable transmission. The transmission includes (i) an input shaft driven by an engine, (ii)an output shaft, (iii)an operator input for generating speed commands, and (iv) a controller operable to receive said speed commands and generate transmission ratio commands which control a ratio of a speed of the output shaft to a speed of the input shaft. The method includes the steps of defining an upper transmission ratio limit with a first engine speed and defining a lower transmission ratio limit with a second engine speed. The method further includes the steps of adjusting the transmission ratio command to the upper transmission ratio limit when the speed command requires a transmission ratio command greater than the upper transmission ratio limit and adjusting the transmission ratio command to the upper transmission ratio limit when the speed command requires a transmission ratio command less than the lower transmission ratio.

BEST MODE FOR CARRYING OUT THE INVENTION

Figure 1:
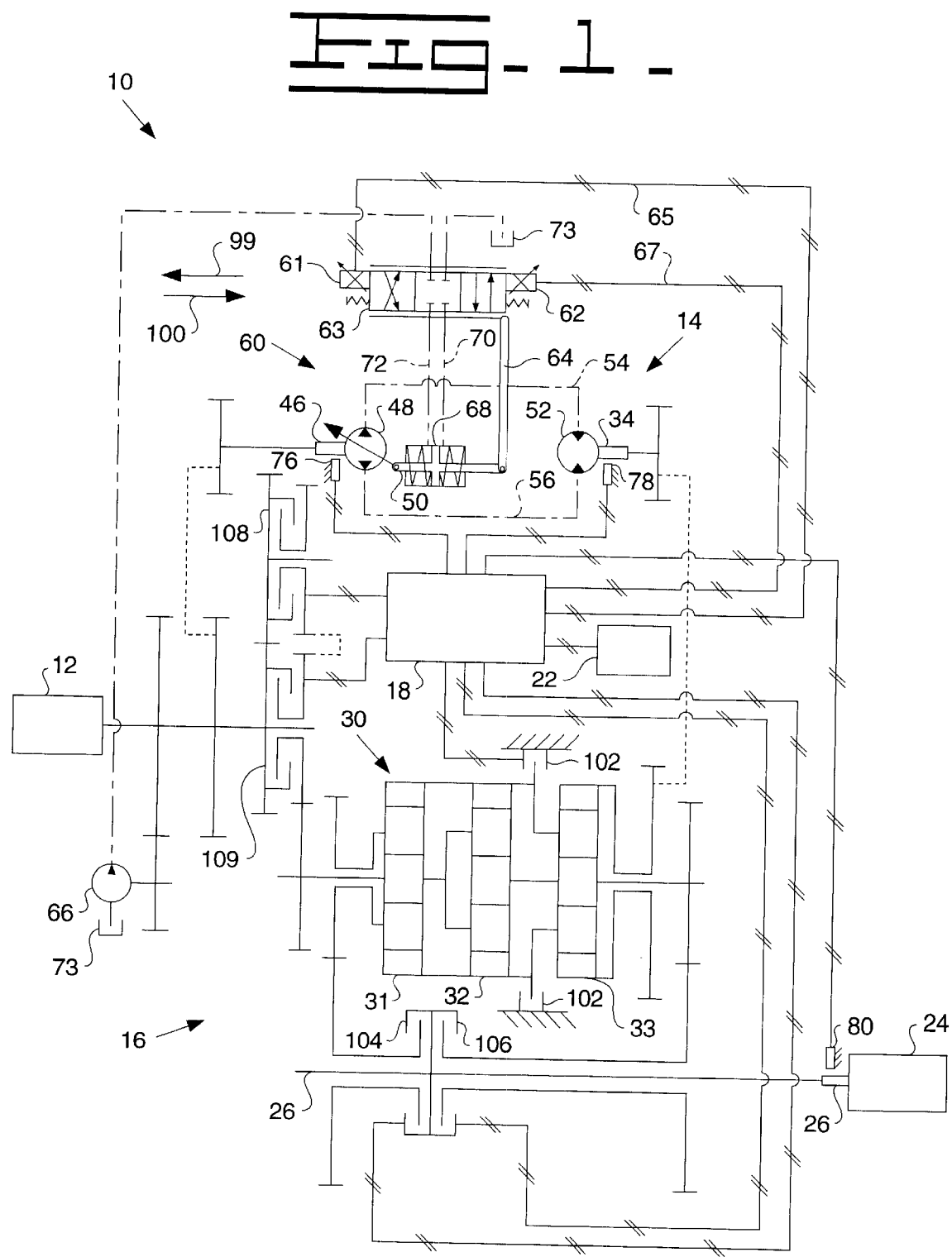
FIG. 1 is a schematic view of a hydro-mechanical, continuously variable transmission which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a transmission assembly 10 that incorporates the features of the present invention therein. The transmission assembly 10 is adapted for use in a work machine, such as a loader (not shown), having an engine 12. The transmission assembly 10 is of the continuously variable type which includes a continuously variable hydrostatic transmission 14, a mechanical transmission 16, a micro-processor based controller 18, and a command input arrangement 22. A work system 24 is connected to the transmission assembly 10 via a drive shaft 26. The work system 24 is typically the drive wheels or tracks of the work machine.

The hydrostatic transmission 14 is operatively connected to the engine 12 through a pump input drive shaft 46. The hydrostatic transmission 14 includes a variable displacement pump 48 and a motor 52 operatively connected to the variable displacement pump 48 by conduits 54 and 56 to form a hydraulic circuit. A displacement controller 50 sets the displacement of the variable displacement pump 48 and thus controls the flow of hydraulic fluid between the variable displacement pump 48 and the motor 52. Varying the flow varies the speed of the motor output shaft 34 of the motor 52.

The position of the pump displacement controller 50 is controlled by an electro-hydraulic servo mechanism 60. The servomechanism 60 includes a first solenoid or first actuator 61 and a second solenoid or second actuator 62, a three position four way valve 63, and a feedback arm 64. When a current, is supplied to the first actuator 61 via a signal line 65, the first actuator 61 moves the three position valve in the direction of arrow 100 so as to place the valve 63 in a first position. In the first position, the valve 63 causes high pressure fluid from a separate pump 66 to be supplied to a piston member 68 via a line 70 which causes the displacement controller 50 to move in the general direction of arrow 99. Movement of the displacement controller 50 in the general direction of arrow 99 places the variable displacement pump 48 in a positive displacement. Excess fluid exits the displacement controller 50 via a line 72 and is returned to a fluid sump 73. The force of the fluid on the piston member 68 also acts on the position feedback arm 64 in the general direction of arrow 99. An equilibrium is set up between the force exerted by the first actuator 61 in the general direction of arrow 100 and the force exerted by position feedback arm 64 in the general direction of arrow 99. Thus, for positive displacements, the position of the displacement controller 50 is proportional to the current supplied to the first actuator 61 as the first actuator command.

When a current is supplied to the second actuator 62 via a signal line 67, the second actuator 62 moves the three position valve in the direction of arrow 99 so as to place the valve 63 in a second position. In the second position, the valve 63 causes high pressure fluid from the charge pump 66 to be supplied to a piston member 68 via the line 72 which causes the displacement controller 50 to move in the general direction of arrow 100. Movement of the displacement controller 50 in the general direction of arrow 100 places the variable displacement pump 48 in a negative displacement. Excess fluid exits the displacement controller 50 via the line 70 and is returned to a fluid sump 73. The force of the fluid on the piston member 68 also acts on the position feedback arm 64 in the general direction of arrow 100. An equilibrium is set up between the force exerted by the second actuator 62 in the general direction of arrow 99 and the force exerted by position feedback arm 64 in the general direction of arrow 100. Thus, for negative displacements, the position of the displacement controller 50 is proportional to the current supplied to the second actuator 62 as the second actuator command. It should be appreciated that the first actuator 61 can only place the variable displacement pump 48 in positive displacements and the second actuator 62 can only place the variable displacement pump 48 in negative displacements.

The mechanical transmission 16 includes a summing planetary gear arrangement 30, having a first planetary gear set 31, a second planetary gear set 32, and a third planetary gear set 33 which selectively combines the output from the continuously variable hydrostatic transmission 14 with the output of the engine 12 to drive the output shaft 26. To select a first gear range 110, a clutch 102 and a clutch 104 are engaged. To select a second forward gear range 120, a clutch 108 and the clutch 104 are engaged. To select a third forward gear range 130, the clutch 108 and a clutch 106 are engaged. To select a second reverse gear range 140, a clutch 109 and the clutch 104 are engaged. To select a third reverse gear range 150, the clutch 109 and a clutch 106 are engaged.

The transmission 10 further includes a transmission input speed sensor 76 operative to sense the speed of the pump input shaft 46 and direct a transmission input speed signal representative of the transmission input speed or engine speed to the controller 18. The transmission 10 yet further includes a motor speed sensor 78 operative to sense the speed of the motor output shaft 34 and direct a motor speed signal representative of the motor output speed to the controller 18. The motor speed signal combined with the transmission input speed signal can also be used to determine a transmission output speed and a machine travel speed if the engagement state of the clutches 102, 104, 106, 108, and 109 are known.

The transmission 10 further includes a transmission output speed sensor 80 is operative to sense the transmission output speed and direct a transmission output speed signal to the controller 18. Either of the motor speed sensor 78 combined with the input speed sensor 76 or the transmission output speed sensor 80 can be used to calculate the transmission output speed or the machine travel speed. However, in the present invention, the motor speed sensor 78 is used to precisely control the displacement of the pump 48 and therefore has a much higher resolution and lower dropout than the transmission output speed sensor 80. Thus, it is preferable to use the motor speed sensor 78 and the engagement state of the clutches 102, 104, 106, 108, and 109 to determine the transmission output speed and the machine travel speed. However, it is still possible and practical to use the output speed sensor 80 to determine machine travel speed.

The command input arrangement 22 receives operator inputs and transmits desired velocity and directional signals to the controller 18. The controller 18 includes RAM and ROM (not shown) that store transmission control software. The controller 18 reads the desired velocity, reads the directional signals, reads the speed sensors 76, 78, 80, and transmits clutch control signals to control the engagement of the clutches 102, 104, 106, 108, 109 to engage the appropriate gear range as described above. In addition, the controller 18 generates the transmission ratio commands which control the displacement of the pump 48, and thus, the speed of the output shaft 34 of the motor 52.

Figure 2:
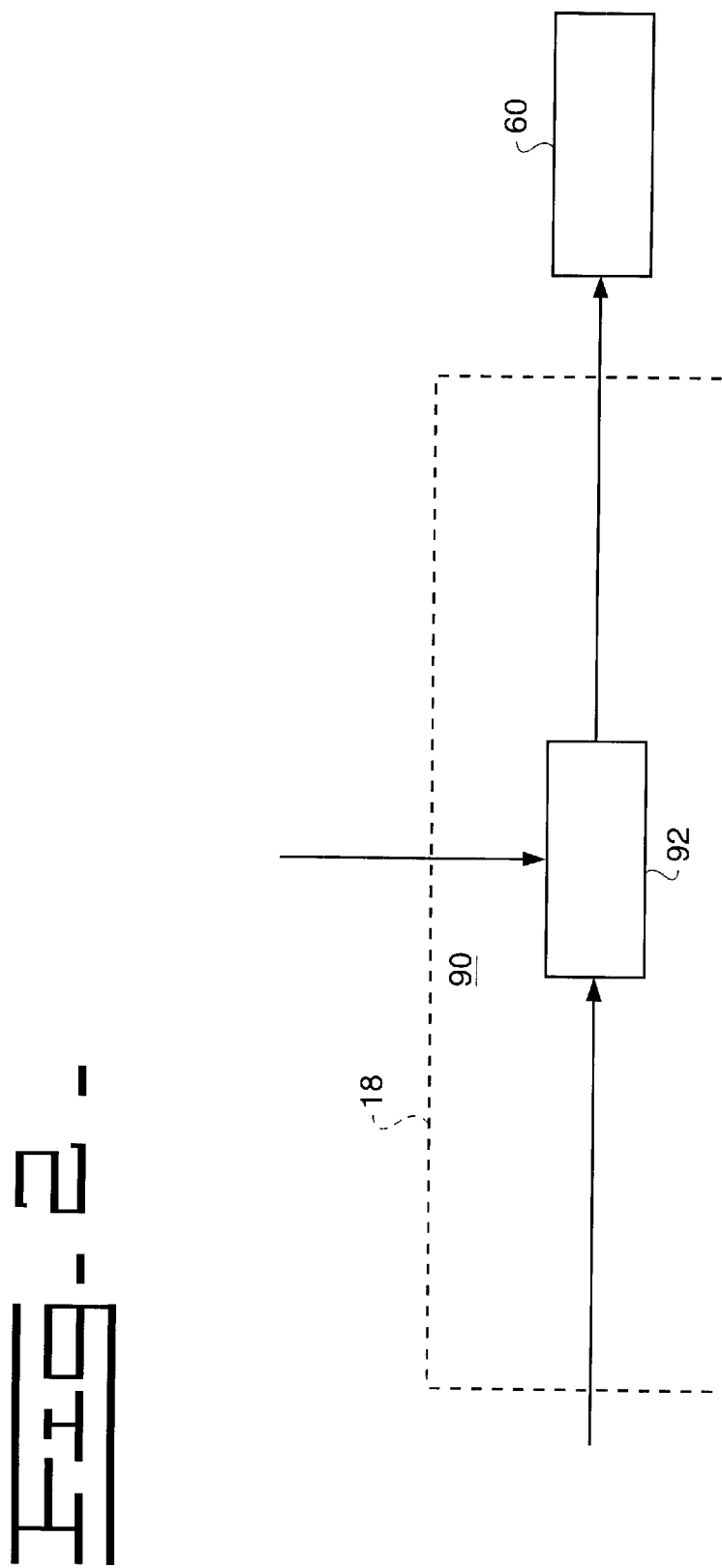
FIG. 2 is a schematic view of an open loop control incorporating a command limiting algorithm.

Referring now to FIG. 2, there is shown a schematic view of a control algorithm 90 within the controller 18. The control algorithm 90 receives the actual machine travel speed and the transmission ratio commands generated by the controller 18. As an intermediate step, the transmission ratio commands are passed through the limiting algorithm 92 to generate modified transmission ratio commands which are sent to the displacement controller 50 via the signal line 65,67 to control the displacement of the variable displacement pump 48 so as to control the transmission ratio of the transmission 10.

Figure 3:
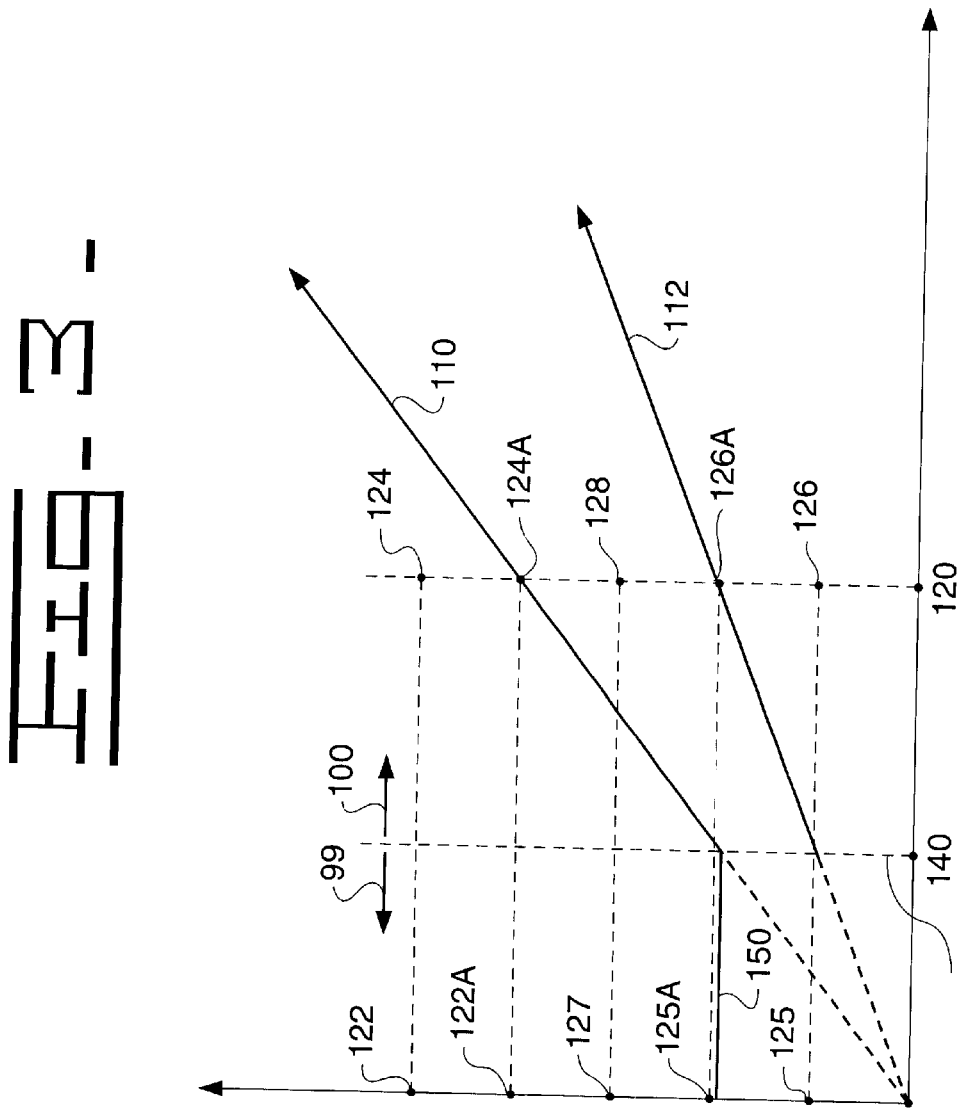
FIG. 3 is graph of upper transmission ratio limit and lower transmission ratio limit as a function of machine travel speed.

Referring now to FIG. 3, there is shown a graph which illustrates the limiting algorithm 92. The limiting algorithm 92 includes an upper ratio limit 110 and a lower transmission ratio limit 112. The upper transmission ratio limit is based on an optimal lug point or lug limit of the engine 12. In particular, the upper transmission ratio limit 110 is the ratio of the machine travel speed to an engine lug limit. The engine lug limit is an actual engine speed below which it is undesirable to operate the engine 12 due to the likelihood that if the engine 12 were to drop too far below the lug limit, the engine 12 will stall. In addition, the engine lug point is set to cause the engine to operate at an optimal peak power point. It should be appreciated that the engine 12 in the present invention is set at a constant governor speed and the speed of the output shaft 26 is controlled by the continuously variable transmission ratio.

On the other hand, the lower transmission ratio limit 112 is the ratio of the machine travel speed to an engine or drivetrain overspeed limit. The engine overspeed limit is an actual engine speed above which it is undesirable to operate the engine 12 due to the likelihood that the engine and/or drivetrain components could fail. It should be appreciated that both the engine lug limit and the engine overspeed limit are specific to a particular engine 12 and transmission 10.

The limiting algorithm 92 modifies the transmission ratio commands to keep transmission ratio commands between the upper transmission ratio limit 110 and the lower transmission ratio limit 112. For example, if the machine travel speed is at a speed 120 and a transmission ratio command 122 is generated by the controller 18, then the unmodified transmission ratio command 124 commands the transmission to operate at a point 124 which falls above the upper transmission ratio limit 110. If the transmission ratio command 124 is not modified, the speed of the engine 12 would fall below the lug limit and possibly cause the engine 12 to stall or not operate at its optimal point. The limiting algorithm 92 commands the transmission 10 to operate at the point 124A which corresponds to the engine lug limit at the machine travel speed 120. Therefore, the transmission ratio command is limited to a transmission ratio 122A which causes the engine 12 to operate at the point 124A thereby preventing the speed of the engine 12 from falling below the engine lug limit.

When the machine travel speed is at the speed 120 and a transmission ratio command 125 is generated by the controller 18, then the unmodified transmission ratio command 125 would command the transmission to operate at a point 126 which falls below the lower transmission ratio limit 112. If the transmission ratio command 125 is not modified, the speed of the engine 12 would exceed the engine and drivetrain overspeed limit and possibly cause the engine 12 and drivetrain to fail. The limiting algorithm 92 commands the transmission to operate at the point 126A which corresponds to the engine overspeed limit at the machine travel speed 120. Therefore, the transmission ratio command is limited to a transmission ratio 125A which commands the transmission to operate at the point 126A thereby preventing the speed of the engine 12 from exceeding the engine and drivetrain overspeed limit at the machine travel speed 120.

When the machine travel speed is at the speed 120 and a transmission ratio command 127 is generated by the controller 18, then the unmodified transmission ratio command 127 would command the transmission to operate at a point 128 which falls between the lower transmission ratio limit 112 and the upper transmission ratio limit 110. Thus, the transmission ratio command 127 causes the engine 12 to operate at a desirable range between the engine lug limit and the engine overspeed limit. Therefore, the transmission ratio command 127 is not modified by the limiting algorithm 92 when the transmission ratio command 127 commands the transmission 10 to operate at a point 128 between the upper transmission ratio limit 110 and the lower transmission ratio limit 112.

A limitation to the limiting algorithm 92 is that there are drawbacks to using the limiting algorithm at low machine travel speed. In particular, at low machine travel speeds the upper transmission ratio limit 110 and the lower transmission ratio limit 112 converge. Therefore, a cutoff speed 140 is set where the upper transmission ratio limit 110 and the lower transmission ratio limit 112 are no longer applied by the limiting algorithm 92. The cutoff speed 140 could be a fixed value or a function of transmission parameters depending on the requirements of the application.

INDUSTRIAL APPLICABILITY

In operation, the limiting algorithm 92 is used in conjunction with the open loop controller 90 to ensure that transmission ratio commands fall between an upper transmission ratio limit 110 and a lower transmission ratio limit 112.

When the controller 18 generates a transmission ratio command which causes the transmission 10 to operate at a point 124 above the upper transmission ratio limit 110, the limiting algorithm 92 limits the transmission ratio command to the point 124A which corresponds to the engine lug limit at the machine travel speed 120. Thus, the limiting algorithm 92 prevents the controller 18 from commanding a transmission ratio which would cause the speed of the engine 12 to fall below the engine lug limit at the actual travel speed.

When the controller 18 generates a transmission ratio command which causes the transmission 10 to operate at a point 126 which falls below the lower transmission ratio limit 112, the limiting algorithm 92 limits the transmission ratio command to the point 126A which corresponds to the engine overspeed limit at the machine travel speed 120. Thus, the limiting algorithm 92 prevents the controller 18 from commanding a transmission ratio which would cause the speed of the engine 12 to exceed the engine and or drivetrain overspeed limit at the actual travel speed.

When an unmodified transmission ratio command causes the transmission 10 to operate at a point 128 which falls between the lower transmission ratio limit 112 and the upper transmission ratio limit 110, the limiting algorithm 92 does not modify transmission ratio command because the engine is operating in the desirable range between the lug limit and the overspeed limit at the machine travel speed 120.

In addition, when the machine travel speed falls below the cutoff speed 140, the upper transmission ratio limit 110 and the lower transmission ratio limit 112 converge. Therefore, the limiting algorithm 92 no longer limits the transmission ratio to the upper transmission ratio limit 110 or the lower transmission ratio limit 112. The cutoff speed 140 could be a fixed value or a function of transmission parameters depending on the requirements of the application.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

For example, although the continuously variable transmission 14 is configured as having a variable displacement hydraulic pump 48 and a hydraulic motor, and has significant advantages thereby in the present invention, the continuously variable transmission 14 could also be embodied with a first electric motor/generator driving an second electric motor/generator.

What is claimed is:

1. An apparatus for controlling a continuously variable transmission, comprising:
    an input shaft driven by an engine;
    an output shaft;
    an operator input for generating speed commands; and
    a controller operable to receive said speed commands and generate transmission ratio commands which control a ratio of a speed of the output shaft to a speed of the input shaft, wherein:
    an upper and a lower transmission ratio limit being periodically determined based on the speed of the output shaft and the transmission ratio command being modified to a value between the upper and the lower transmission ratio limit.

2. The apparatus of claim 1, further comprising a speed sensor which measures a speed representative of output speed of the output shaft, wherein:

the upper transmission ratio limit is the ratio of the speed of the output shaft to the lug limit.

3. The apparatus of claim 1, further comprising an output speed sensor which measures a speed representative of speed of the output shaft, wherein:

the lower transmission ratio limit is the ratio of the speed of the output shaft to the overspeed limit.

4. The apparatus of claim 2, wherein:

a cutoff speed is defined near zero speed of the output shaft, and the speed command is adjusted when the speed of the output shaft is greater than the cutoff speed.

5. The apparatus of claim 4, wherein the cutoff speed is a function of the resolution of the speed sensor.

6. A method for controlling a continuously variable transmission having (i) an input shaft driven by an engine, (ii) an output shaft, (iii) an operator input for generating speed commands, and (iv) a controller operable to receive said speed commands and generate transmission ratio commands which control a ratio of a speed of the output shaft to a speed of the input shaft, comprising the steps of:

defining an upper transmission ratio limit based on the speed of the output shaft;

defining a lower transmission ratio limit based on the speed of the output shaft; and modifying the transmission ratio command to a value between the upper and the lower ratio limit.

7. The method of claim 6, further comprising the steps of:

determining periodically upper and lower transmission ratio limits; and modifying accordingly the transmission ratio command to a value between the upper and lower transmission ratio limits.

8. The method of claim 6, the transmission further having a speed sensor which measures a speed representative of output speed of the output shaft, further comprising the steps of:

determining an overspeed limit of the engine based on the speed of the output shaft; determining a lug limit of the engine based on the speed of the output shaft; and controlling a speed of the engine between the lug limit and the overspeed limit through modification of the transmission.

9. The method of claim 8, further comprising the steps of:

defining a cutoff speed near zero speed of the output shaft; and adjusting the speed of the output shaft on condition that the output speed is greater than the cutoff speed.

10. The method of claim 9, further comprising the step of determining the cutoff speed as a function of the resolution of the speed sensor.

* * * * *